United States Patent Office 3,494,843
Patented Feb. 10, 1970

3,494,843
PROCESS FOR THE MANUFACTURE OF 3-OXO-4-OXA-5-HYDROXYMETHYL-STEROIDS
Oskar Jeger, Zollikerberg, Zurich, Hans Ueli Wehrli, Schaffhausen, and Kurt Schaffner, Zurich, Switzerland, assignors to Ciba Corporation, New York, N.Y., a corporation of Delaware
No Drawing. Original application Nov. 23, 1966, Ser. No. 596,424. Divided and this application Feb. 7, 1969, Ser. No. 797,690
Claims priority, application Switzerland, Nov. 30, 1965, 16,492/65
Int. Cl. B01j 1/10
U.S. Cl. 204—158                    2 Claims

ABSTRACT OF THE DISCLOSURE

The process which comprises irradiating with ultraviolet light a 3-oxo-4-RO-5-hydroxysteroid wherein R is hydrogen or a lower alkane carbonyl to obtain the corresponding 3-oxo-4-oxa-5-hydroxymethyl-steroid.

CROSS-REFERENCE TO RELATED APPLICATION

This is a division of our application Ser. No. 596,424, filed Nov. 23, 1966.

The present invention relates to the manufacture of a new group of steroids, namely the 3-oxo-4-oxa-5-hydroxymethylsteroids, of their esters and ethers.

It is known that when 3-oxo-4,5-oxide- or 3-oxo-4-sulphonyloxy-5-hydroxysteroids are irradiated with ultraviolet light, 3,6-dioxo-A-nor-B-homosteroids are obtained according to the following partial formulae:

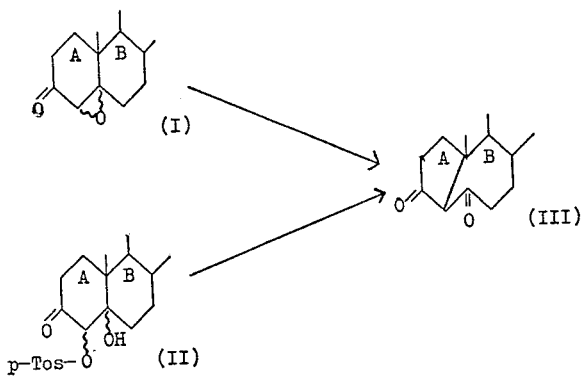

The present invention is based on the unexpected observation that when 3-oxo-4-RO-5-hydroxysteroids, where R represents hydrogen or the residue of a lower aliphatic carboxylic acid, especially of a lower alkanecarboxylic acid, primarily acetic acid or propionic acid, are irradiated with ultraviolet light, the new 3-oxo-4-oxa-5-hydroxymethylsteroids or their esters are formed instead of the 10(5→4)-Abeosteroids (III).

The process of this invention may be represented, for example, by the following simplified partial formulae;

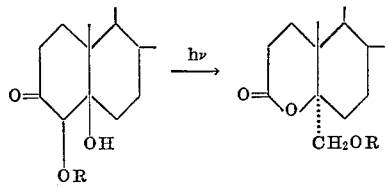

where R stands, for example, for hydrogen or acetyl.

The starting materials to be used in the new process belong preferably to the androstane, pregnane, cholane, cholestane, spirostane or cardanolide series; their ring system and side-chain may contain one or several substituents such, for example, as free or functionally modified hydroxyl or keto groups, for example acyloxy groups of carboxylic acids containing up to 20 carbon atoms, such as acetoxy, propionoxy, benzoyloxy groups, lower alkoxy such as methoxy or ethoxy groups, the tetrahydropyranyloxy group or lower alkylenedioxy, such as ethylenedioxy, 1,2- or 1,3-propylenedioxy groups; furthermore lower aliphatic hydrocarbon residues, for example lower alkyl, alkylene, alkenyl or alkinyl groups such as methyl, ethyl, propyl, methylene, vinyl, allyl, ethinyl or propargyl groups or halogen such as fluorine or chlorine atoms. The starting materials may also contain one or several double bands.

The acyloxy group in the 4-position of the starting materials contain as acyl radical more especially the residue of a lower alkanecarboxylic acid, for example the acetic or propionic acid.

Preferred starting materials are those of the formula

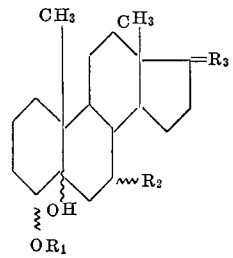

where $R_1$ represents a hydrogen atom or a lower alkanoyl residue, especially the acetyl radical, $R_2$ stands for a hydrogen atom or an $\alpha$-positioned lower alkyl group and $R_3$ for an oxo or lower alkylenedioxy group or a free, esterified or etherified $\beta$-positioned hydroxyl group together with a hydrogen atom or a lower aliphatic hydrocarbon residue.

The irradiation according to this invention is advantageously carried out in an organic solvent, for example in an aliphatic, cycloaliphatic or aromatic hydrocarbon such as pentane, hexane, cyclohexane, methylcyclohexane, benzene or toluene, in an alcohol such as ethanol or tertiary butanol and/or an ether such as diethyl ether or dioxan, at room temperature or with cooling or heating, in the presence or absence of a basic agent and/or in an inert gas.

The irradiation is carried out with artificial or strong natural light. A preferred source of light is a mercury vapour low or high pressure burner.

Any esters or protective groups, such as ketals, present in the resulting 4-oxa compounds may be split hydrolytically, and free hydroxyl groups may be oxidized to oxo groups. On the other hand, process products that contain free hydroxyl groups may be converted in known manner into their esters or ethers, for example by acylation with carboxylic acid anhydrides or carboxylic acid halides or by reaction with dihydropyran.

Starting materials that contain a possibly esterified 4-hydroxyl group can be obtained, for example, by hydroxylating a $\Delta^4$-3-oxosteroid in the 4,5-position with hydrogen peroxide in the presence of osmium tetroxide and, if desired, reacting the resulting dihydroxy compound with a reactive functional derivative of a lower aliphatic carboxylic acid in the presence of a base, for example pyridine. Alternatively, a $\Delta^4$-3-oxosteroid may be reacted in a reaction vessel equipped with a water separator with a lower alcohol, especially a lower glycol such as ethyleneglycol, in a boiling hydrocarbon such as benzene or toluene, in the presence of an organic carboxylic acid, advantageously an alkanedicarboxylic acid such as oxalic, succinic or preferably adipic acid, to form the $\Delta^4$-3-ketal, hydroxylating the latter in the 4,5-position for instance with osmium tetroxide in an organic base, such as pyridine, treating the resulting osmium compound with hydrogen sulphide, converting the resulting 4,5-dihydroxy-steroid-3-ketal into the 4-acyloxy compound as described above and liberating the 3-oxo group in known manner.

The process products are pharmacologically active substances or valuable intermediates for use in the manufacture thereof. Thus, for example, the process products of the androstane series possess an antiandrogenic and antioestrogenic action and inhibit the hypophysis. When the product obtained belongs to the pregnane, cholane, cholestane, spirostane or cardanolide series it may, if desired, be converted in known manner into the pharmacologically active compounds, for example by acylolysis, oxidation and/or by microbiological methods.

The following examples illustrate the invention without restricting it in any manner:

Example 1

500 mg. of 3-oxo-4β,5β-dihydroxy-17β-acetoxyandrostane in 160 ml. of absolute benzene are irradiate for 6 hours at room temperature under nitrogen in a quartz vessel equipped with a mercury high-pressure burner. The batch is evaporated under vacuum and the residue is chromatographed on silica gel. A 2:1-mixture of hexane+acetone elutes 350 mg. of crystalline 3-oxo-5-hydroxymethyl-17β-acetoxy-4-oxo-androstane. After three recrystallizations from acetone+petroleum ether the product melts at 213–216° C. In the infrared spectrum it reveals bands at 3600–3350, 1725 and 1250 cm.$^{-1}$.

Example 2

A mixture of 2.5 g. of 3-oxo-4β,5β-dihydroxy-17β-acetoxyandrostane and 20 ml. of a 1:1-mixture of acetic anhydride+pyridine is kept overnight at room temperature, and the solution is then evaporated under vacuum. The resulting 3-oxo-4β,17β-diacetoxy-5β-hydroxyandrostane is redissolved from acetone+petroleum ether; it melts at 225 to 226° C. Optical rotation $[\alpha]_D = +50°$ (c.=0.61). Infrared bands: 3590, 1745, 1726 and 1250 cm.$^{-1}$.

500 mg. of the compound obtained in this manner are irradiated in 160 mg. of absolute benzene for 3 hours as described in Example 1. Chromatography of the crude product on silica gel in a 2:1-solution of benzene+ethyl acetate yields 424 mg. of crystals which, after three recrystallizations from acetone+petroleum ether, melt at 215 to 216° C. the resulting 3-oxo-5-acetoxymethyl-17β-acetoxy-4-oxa-androstane reveals in its infrared spectrum bands at 1735 (shoulder), 1725 and 1250 cm.$^{-1}$. Optical rotation $[\alpha]_D = +38°$ (c.=0.53).

Example 3

70 mg. of the compounds obtained in Example 1 are acetylated overnight at room temperature in 5 ml. of a 1:1-mixture of acetic anhydride and pyridine, then evaporated under vacuum and the residue dissolved in benzene and filtered through neutral alumina (activity III), to yield 65 mg. of 3-oxo-5-acetoxymethyl-17β-acetoxy-4-oxo-androstane which, after four recrystallizations from acetone+petroleum ether, melts at 210 to 212° C. Optical rotation $[\alpha]_D = +40.7°$ (c.=0.74). According to its mixed melting point, infrared spectrum and thin-layer chromatogram this product is identical with the product obtained in Example 2.

Example 4

200 ml. of 3-oxo-5-acetoxymethyl-17β-acetoxy-4-oxa-androstane in 12 ml. of saturated methanolic potassium carbonate solution are hydrolyzed for 1½ hours at room temperature. The usual working up and chromatography of the crude product in acetone+hexane 2:1-solution on silica gel yields 120 ml. of 3-oxo-5-hydroxymethyl-17β-hydroxy-4-oxa-androstane which, after two recrystallizations from acetone+petroleum ether, melts at 236° C. Optical rotation $[\alpha]_D = +42.5°$ (c.=0.73). Infrared spectrum: 3610, 3420–3400 and 1725 cm.$^{-1}$.

The 3-oxo-4β,5β-dihydroxy-17β-acetoxy-androstane used as starting material in the above examples may be prepared in the following manner:

3 grams of testosterone acetate in 200 ml. of ether are mixed with 100 ml. of osmium tetroxide and 12 mm. of hydrogen peroxide. The mixture is stirred for 6 days at room temperature in the dark, then diluted with ethyl acetate, washed with potassium iodide solution and sodium thiosulphate solution and with water. The crude product obtained on evaporation is filtered in ether through silica gel and then redissolved from acetone+petroleum ether; it melts at 170 to 173° C. Optical rotation $[\alpha]^D = +27°$ (c. = 0.64). Infrared bands at 3600–3300, 1725 and 1257 cm.$^{-1}$.

We claim:

1. The process which comprises irradiating with ultraviolet light a 3-oxo-4-RO-5-hydroxysteroid of the androstane, pregnane, cholane, cholestane, spirostane or cardanolide series, in which R represents a member selected from the group consisting of hydrogen and lower alkane carbonyl to obtain the corresponding 3-oxo-4-oxa-5-hydroxymethyl steroid.

2. The process as claimed in claim 1, wherein there is used as starting material a compound of the formula

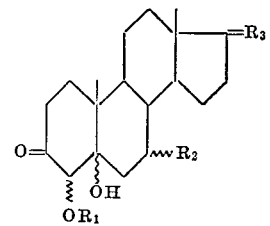

where $R_1$ represents a hydrogen or a lower alkanoyl residue, $R_2$ stands for a hydrogen atom or a lower alkyl group and $R_3$ for an oxo or lower alkylenedioxy group or a free, esterified or etherified β-positioned hydroxyl group together with a hydrogen atom or a lower aliphatic hydrocarbon residue.

References Cited

UNITED STATES PATENTS 3,219,565   11/1965   Rappoldt _____ 204—158

HOWARD S. WILLIAMS, Primary Examiner